(No Model.)

H. C. PARKER.
ELECTRICAL MEASURING INSTRUMENT.

No. 550,841. Patented Dec. 3, 1895.

WITNESSES:
H. Walker

INVENTOR
H. C. Parker
BY
Munn & Co.
ATTORNEYS.

UNITED STATES PATENT OFFICE.

HERSCHEL C. PARKER, OF BROOKLYN, NEW YORK.

ELECTRICAL MEASURING-INSTRUMENT.

SPECIFICATION forming part of Letters Patent No. 550,841, dated December 3, 1895.

Application filed May 9, 1895. Serial No. 548,754. (No model.)

*To all whom it may concern:*

Be it known that I, HERSCHEL C. PARKER, of Brooklyn, in the county of Kings and State of New York, have invented a new and Improved Electrical Measuring-Instrument, of which the following is a full, clear, and exact description.

This invention relates to certain improvements in electrical measuring-instruments, and has for its object to provide a device of this character of an improved and simplified construction which shall be adapted to accurately indicate the volts and ampères of an electric current.

The invention consists in a coil of wire pivotally or rotatively mounted between the poles of a permanent magnet or equivalent device for indicating current or electromotive force and adapted to move an index playing over a scale graduated to indicate either volts and ampères, or both, said coil being adapted to be placed in circuit with either a resistance, when it is desired to ascertain the voltage of a current, and when it is desired to ascertain the ampèrage being adapted to be included in a shunt or branch circuit from the main circuit, said resistance being then cut out of circuit with said coil.

The invention also contemplates certain novel details of construction and combinations of parts whereby certain advantages are attained over similar devices heretofore in use, all as will be hereinafter fully set forth.

The novel features of the invention will be carefully defined in the claims.

In order that my improvements may be the better understood, I have illustrated in the accompanying drawings a combination electrical measuring-instrument constructed in accordance with my invention, in which drawings—

Figure 1:
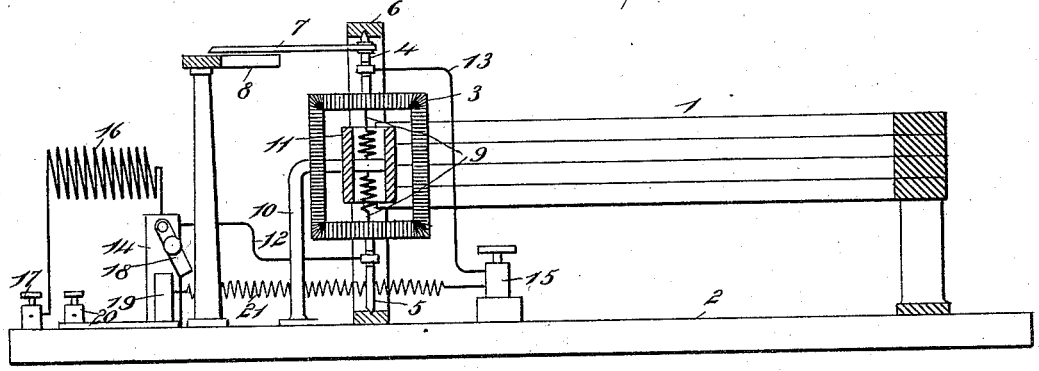
Figure 2:
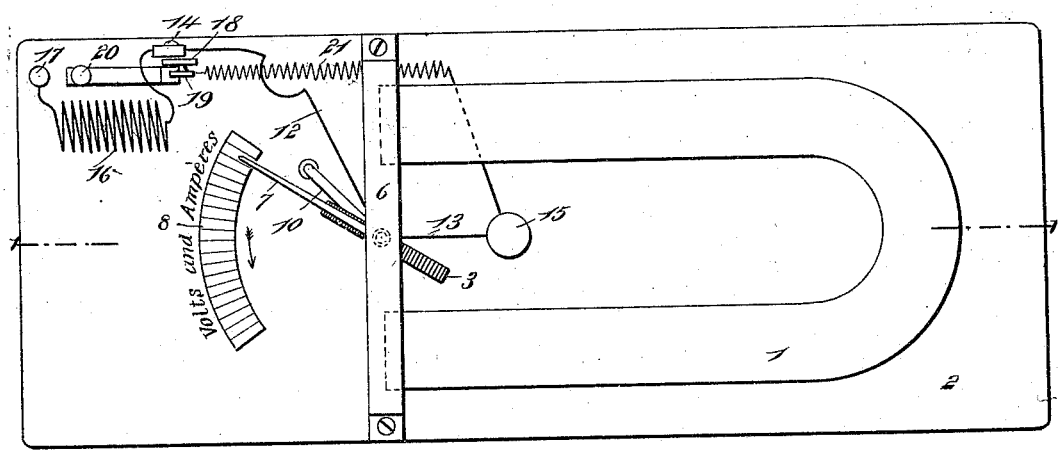
Figure 3:
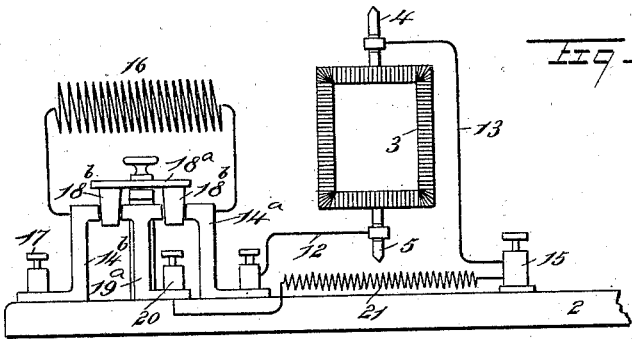
Figure 4:
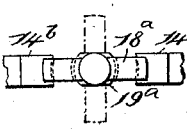

Figure 1 is a sectional side elevation of the line 1 1 of Fig. 2; Fig. 2, a plan view of the meter. Fig. 3 is a partial side view showing a modified arrangement of the parts to be referred to hereinafter, and Fig. 4 is a fragmentary plan view of the switch device shown in Fig. 2.

Similar characters of reference indicate corresponding parts in all the figures.

In the views, 1 represents a permanent horseshoe magnet suitably supported on a base 2, and 3 represents a coil wound in an open rectangular form and provided with aligned bearings 4 and 5, projecting, respectively, from the central portions of its upper and lower sides and having their extremities mounted in sockets in a bearing-piece 6, secured on the base 2. The coil is provided with an index 7, secured to its upper bearing 4 and arranged to play over a segmental scale 8, suitably supported on the base 2, and said scale is graduated to indicate volts and ampères, being by preference a multiple scale, wherein ten of the graduations indicating volts indicate one ampère, for example.

The coil 3 is adapted to stand normally in the position shown in Fig. 2, so that the index 7 stands normally opposite the zero-point in scale 8, and in order to maintain the parts normally in their proper positions I employ spiral springs 9, connected at their respective upper and lower ends to the central portions of the lower and upper sides of the coil 3, as seen in Fig. 1, and these springs 9 are aligned with each other and with the bearings 4 and 5 of coil 3, being connected at their opposite adjacent ends to the opposite sides of a bent support or post 10, fixed on base 2, and provided with a tubular guard 11 at its extremity, inclosing said springs.

The terminals of the coil 3 are electrically connected to contact-rings mounted on the respective bearings 4 and 5, and these rings are arranged to contact at all times with brushes or equivalent contact devices connected by wires 12 and 13, respectively, with a post 14 and a binding-screw 15, mounted on the base 2. The post 14 is electrically connected with one end of a coil 16 of high resistance, the other end of the said coil 16 being in circuit with a binding-screw 17, and on said post 14 is pivoted a switch 18, one end of which is adapted to contact with a contact-block 19, mounted on the base 2, when the said switch is operated, as will be hereinafter explained, said contact-block 19 being in electrical communication with a third binding-screw 20, as clearly indicated in the drawings. The contact-block 19 is in circuit with a conductor 21, having a low resistance, the opposite end of said conductor being connected to the binding-screw 15. The binding-screws 15, 17, and 20 are employed for connecting the meter up in the circuit to be tested, the opposite terminals of said circuit being connected to the binding-screws 15 and 17 when it is desired to use the device as a voltmeter and to the binding-screws 15 and 20 where it is desired to use the device as an ammeter.

When it is desired to measure the voltage of a current, the circuit-terminals are connected to the binding-posts 17 and 15, and the switch 18 is operated to place the post 14 out of electrical communication with the contact-block 19, whereupon the current flows through the resistance 16, wire 12, coil 3, and wire 13 to binding-post 15, causing the coil 3 to be deflected from its normal position, so as to move the index 7 along the scale in the direction of the arrow in Fig. 2 to an extent commensurate with the electromotive force of the current.

When it is desired to measure the ampèrage of a current, the circuit-terminals are connected to the binding-screws 20 and 15 and the switch 18 is operated so as to place the coil 3 and its wires 12 and 13 in a shunt or branch circuit from the main circuit comprising the low-resistance conductor 21, whereupon the current will be divided and a portion thereof will flow through the shunt-circuit, including coil 3, the main body of the current passing along the conductor 21, whereby the coil 3 will be deflected and the index 7 caused to travel along the scale 8 to an extent commensurate with the ampèrage of the current.

In Fig. 3 I have shown a modified arrangement of the device wherein in lieu of the post 14 two posts 14$^a$ and 14$^b$, spaced apart, are employed, said posts being in circuit with the terminals of the high resistance 16 and with the wire 12 and binding-screw 17, respectively. The central block 19 is replaced by a post 19$^a$, arranged centrally between the posts 14$^a$ and 14$^b$, as clearly seen in Fig. 4, which is a detail plan view of these parts, and at its upper part is pivoted a rotary switch 18$^a$, having plugs 18$^b$ adapted when the switch is rotated to close the circuit between the respective posts 14$^b$, 19$^a$, and 14$^a$. This form of the device is adapted for use when it is desired to determine the voltage and ampèrage of an electric current without changing the connection of the terminals of the circuit through which said current flows. The leading-in wires are connected to binding-posts 15 and 17, and when the device is used as a voltmeter the switch 18$^a$ is opened, so that the current flows through the high resistance 16 and the rotative coil 3. When the device is used as an ammeter, the switch 18$^a$ is closed, so that the high resistance 16 is short-circuited, whereupon the current flows through the rotating coil 3 and the shunt-conductor 21.

The device constructed as above described is of an exceedingly simple and inexpensive construction and forms a very convenient instrument in use for measuring the voltage and ampèrage of currents, since it is not liable to become deranged, and the parts are adapted to be adjusted so as to operate with the utmost accuracy. Moreover, the arrangement of the terminals is such that the binding-screw 15 serves when the device is used either as a voltmeter or ammeter.

I do not wish to be understood as limiting myself to the precise construction and arrangement of my improved measuring-instrument as herein shown, since it is evident some change may be made therein without material departure from the spirit of the invention.

Having thus described my invention, I claim as new and desire to secure by Letters Patent—

1. In an electrical measuring instrument, the combination with a base, of a magnet supported thereon, a frame embracing the poles of said magnet, a coil arranged between the poles, a spindle at the upper and lower portion of the coil and having bearings in the frame, an arm extending upwardly from the base and thence to the center of the coil, a sleeve carried by the extremity of the arm, two springs connected to the arm and to the upper and lower parts of the coil respectively and arranged within the sleeve, an indicator carried by the coil, a scale and electrical connections, substantially as described.

2. In an electrical measuring instrument, the combination with a base, a magnet and a coil, of a standard, a double switch bar pivoted thereon, two additional standards juxtaposed to the first standard and capable of electrical contact with the switch bar, and electrical connections for the several parts, substantially as described.

3. In an electrical measuring instrument, the combination of a base, two binding posts thereon, adapted to receive the terminal conductors of a circuit traversed by a current to be measured, a conductor of low resistance having one end connected to one binding post, a conductor of high resistance having one end connected to the other binding post an indicating device, a coil arranged to actuate the indicating device, and having one end connected to the binding post to which is connected the conductor of low resistance, and its other end adapted for connection to the other binding post through the conductor of high resistance, and a switch for connecting the free end of the low resistance conductor in circuit with that binding post to which the high resistance conductor is connected, said low resistance conductor being then in multiple with the said coil, substantially as set forth.

4. In an electrical measuring instrument, the combination of a base, two binding posts thereon, adapted to receive the terminal conductors of a circuit traversed by a current to be measured, a conductor of low resistance having one end connected to one binding post, a conductor of high resistance having one end connected to the other binding post, an indicating device, a coil arranged to actuate the indicating device, and having one terminal connected to the binding post to which is connected the conductor of low resistance, and its other end adapted for connection to the other binding post through the conductor of high resistance and independent thereof, and a switch controlling the connection between said last named binding post and the coil and also arranged, when actuated to place the coil in connection with the said binding post independent of the high resistance conductor, to simultaneously connect said low resistance conductor with the binding post to which the high resistance conductor is connected in multiple with said coil, substantially as set forth.

HERSCHEL C. PARKER.

Witnesses:
REMSEN RUSHMORE,
JACOB G. PREGENSER.